United States Patent [19]

Tsuyama

[11] Patent Number: 4,577,261
[45] Date of Patent: Mar. 18, 1986

[54] LAMP MOUNTING STRUCTURE FOR BICYCLE

[75] Inventor: Sadaharu Tsuyama, Osaka, Japan

[73] Assignee: Tsuyama Mfg. Co., Ltd., Japan

[21] Appl. No.: 645,902

[22] Filed: Aug. 29, 1984

[30] Foreign Application Priority Data

Aug. 31, 1983 [JP] Japan .................... 58-135034

[51] Int. Cl.⁴ .................... B62J 6/00; F21V 33/00
[52] U.S. Cl. .................... 362/72; 362/396; 362/191; 24/615
[58] Field of Search .................... 362/72, 396, 226, 418, 362/427, 157; 315/77, 191, 200; 24/615, 614, 618

[56] References Cited

U.S. PATENT DOCUMENTS

| | | | |
|---|---|---|---|
| 1,044,772 | 11/1912 | Gilbough | 362/396 |
| 1,263,560 | 4/1918 | Kaufmann | 362/396 |
| 1,319,393 | 10/1919 | Hollis | 362/418 |
| 2,788,763 | 4/1952 | Ries | 362/72 |
| 3,844,000 | 10/1974 | Hedu | 24/618 |
| 4,110,873 | 9/1928 | Verchere | 24/615 |
| 4,462,064 | 7/1984 | Schweltza | 362/191 |

FOREIGN PATENT DOCUMENTS

| | | | |
|---|---|---|---|
| 35565 | 8/1961 | Switzerland | 362/72 |
| 29841 | of 1897 | United Kingdom | 362/396 |
| 681715 | 10/1952 | United Kingdom | 362/72 |
| 2071301 | 9/1981 | United Kingdom | 362/72 |

Primary Examiner—Ronald H. Lazarus
Attorney, Agent, or Firm—Allegretti, Newitt, Witcoff & McAndrews, Ltd.

[57] ABSTRACT

A lamp mounting structure for a bicycle, comprising a mounting unit which includes a flanged disk and a wavy plate to firmly hold therebetween a part of a bicycle, such as a seat stay. A lamp mount is detachably connected to said mounting unit, for example, by screws and has angle adjusting means for adjusting the angular position of said lamp mount relative to said mounting unit. A lamp unit is detachably mounted on said lamp mount. Said lamp mount and said lamp unit are provided with slide coupling means for their relative sliding movement on each other.

6 Claims, 5 Drawing Figures

LAMP MOUNTING STRUCTURE FOR BICYCLE

BACKGROUND OF THE INVENTION

The present invention relates to a lamp mounting structure for bicycles which is adapted to be set on a part of a bicycle framework, such as a seat stay or front fork.

In order to attach a tail lamp unit to a framework part, such as a seat stay, a mounting bracket is usually used, which comprises two members to hold or squeeze the seat stay therebetween. The tail lamp is fixedly screwed to the mounting bracket secured to the seat stay by means of the two squeezing members.

Various standards provide that a reflex reflector jointed or screwed to a tail lamp shall be mounted perpendicular with respect to the road surface. However, prior art tail lamps designed for a particular type of bicycle cannot always be mounted perpendicular with respect to the road surface on the seat stay with different types of bicycles, since the frame angle varies according to type of bicycle.

As tail lamps are mainly used at night there is a demand for a detachable tail lamp, which can be detached when not in use in the daytime to reduce the weight of the bicycle as much as possible.

Thus, an object of the present invention is to provide a tail lamp mounting structure which permits easy adjustment of the tail lamp mounting angle to conform to the frame angle of the bicycle.

Another object of the present invention is to provide a tail lamp mounting structure which permits the user to readily attach to and detach from the tail lamp mounting structure the body of the tail lamp unit. Other objects and advantages of the present invention will be made more apparent hereinafter.

SUMMARY OF THE INVENTION

In order to achive the above objects, the tail lamp mounting structure according to the invention essentially comprises; a mounting unit including two members to firmly hold or squeeze a part of a bicycle therebtween; a lamp mount detachably screwed to the mounting unit, and having angle adjusting means for adjusting the angular position of the lamp mount relative to the mounting unit; and a lamp unit detachably mounted on the lamp mount, the lamp mount and the lamp unit being provided with slide coupling means for their relative sliding movement on each other. The angle adjusting means comprises a plurality of openings provided in the lamp mount, the openings in one embodiment including a pair of arcuate slots centered on the same point and in which threaded bolts are passed through said arcuate slots for screwing said lamp mount to said mounting unit. The slide coupling means may comprise a pair of guide rails on opposite sides of the lamp mount, one rail on each side, a tongue projection provided on the tips of said tongue and means provided in the lamp unit for engagement with said latching projection.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
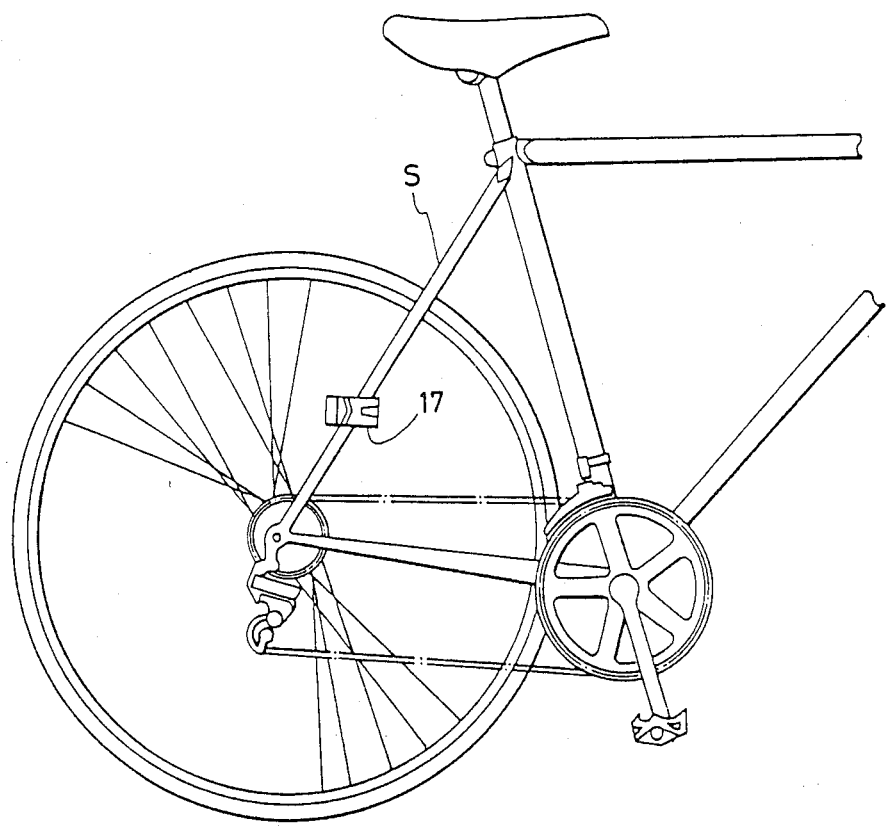
FIG. 1 is a partial side view of a bicycle, showing an embodiment of the lamp mounting structure according to the present invention.
Figure 2:
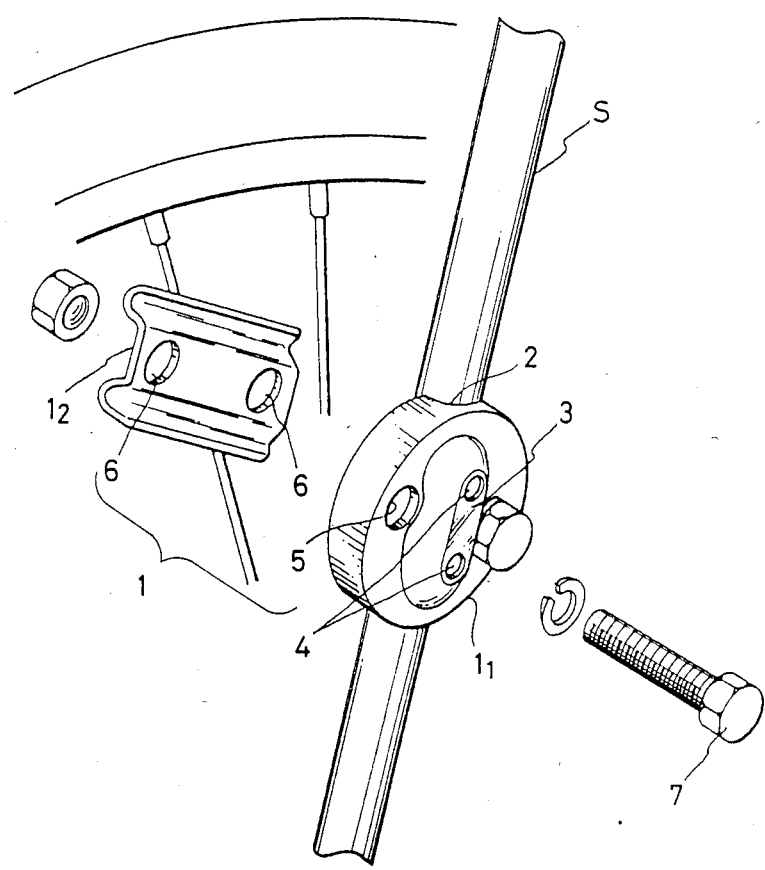
FIG. 2 is an exploded perspective view of a mounting unit of the lamp mounting structure.
Figure 3:
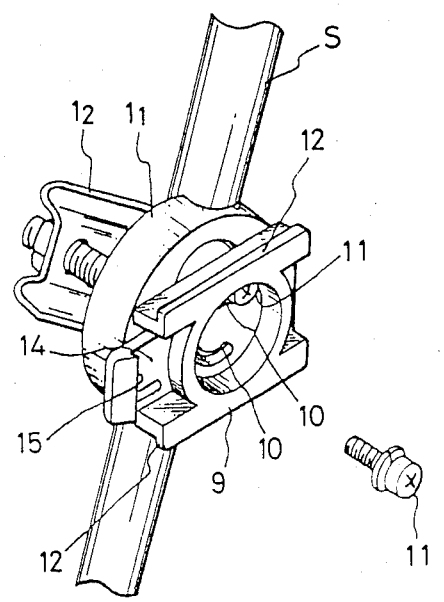
FIG. 3 is a perspective view of the lamp mounting structure, showing a lamp mount joined to the mounting unit of FIG. 2.

FIGS. 1 to 5 show a preferred embodiment of the lamp mounting structure according to the invention. The structure as shown includes a mounting unit 1, which is clearly shown particularly in FIG. 2. The mounting unit 1 comprises a flanged disk $1_1$ and a wavy plate $1_2$, which are mounted on a seat stay S of a bicycle. The disk $1_1$ has in its flange portion a pair of arcuate depressions 2 diametrically opposite to each other. The depressions 2 are shaped to fit on the curved surface of the seat stay S. An embossment 3 of an appropriate width is raised between the depressions 2 by pressing. Threaded holes 4 are provided in the embossment 3. On each side of the embossment 3 there is provided a hole 5 through the disk $1_1$, although only one of these holes 5 is shown in FIG. 2.

The wavy plate $1_2$ is a channel-like member having an appropriate wavy cross section, and is formed with a pair of holes 6 therethrough corresponding to the holes 5 of the disk $1_1$. These holes 6 are adapted to receive a threaded bolt 7. The flanged disk $1_1$ and the wavy plate $1_2$ are assembled on the seat stay S and fastened together by means of the threaded bolts 7 and nuts and washers, holding or squeezing the seat stay S therebetween.

A lamp mount 9 (FIG. 4) is joined to the mounting unit 1 on the embossment 3 by means of screw 11 screwed into the threaded holes 4. The lamp mount 9 comprises angle adjusting means which permits the adjustment of at least the angular position of the lamp mount 9 with respect to the mounting unit 1, and forms together with the mounting unit 1 a slide coupling means which will be described later.

In the embodiment shown, the angle adjusting means comprises a pair of opposite arcuate slots 10 centered at the same point and formed through the lamp mount 9. The screws 11 are passed through the slots 10 and screwed into the holes 4 in the disk $1_1$. When the screws 11 are in loose threading engagement with the threaded holes 4, the lamp mount 9 supported on the screws 11 can be rotated with respect to the mounting unit 1, within the limits determined by the length of the slots 10.

The slots 10 must not necessarily be arcuate. One of them may be a simple round hole serving as a center of rotation for the lamp mount 9.

Figure 4:
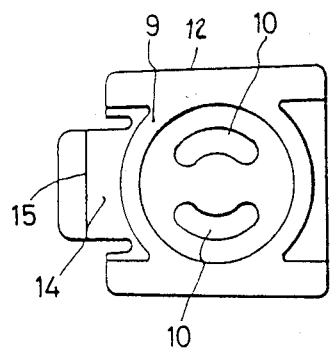
FIG. 4 is a plan view of the lamp mount shown in FIG. 3.
Figure 5:
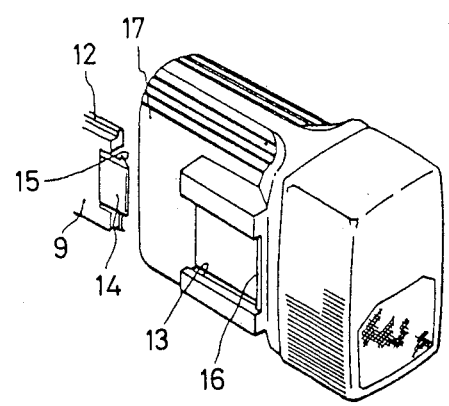
FIG. 5 is a perspective view of a lamp unit for the mounting structure.

The slide coupling means comprises a pair of guide rails 12 formed on opposite sides of the lamp mount 9, and a pair of corresponding guide grooves 13 provided on a lamp unit 17. The guide rails 12, which are adapted to fit in the grooves 13, are not exactly parallel to each other, but slightly inclined (or taper toward the tongue 14) as can be seen in FIG. 4, so as to facilitate fitting of the rails 12 into the grooves 13. As best seen in FIG. 5, a latching projection 15 is formed on the forward end of tongue 14 projecting from another side of the lamp mount 9. The latching projection 15 engages with a projection 16 on the lamp unit 17, whereby the lamp unit 17 is detachably secured to the lamp mount 9.

The projection 16 on the lamp unit 17 for engagement with the latching projection 15 on the lamp mount 9, may be replaced by a depression. Selection of the projection or the depression depends on how far the latching projection 15 projects from the tongue 14.

Also the rails 12 and the grooves 13 may be provided on the lamp unit 17 and the lamp mount 9 respectively, instead of the arrangement as shown.

When the lamp mounting structure thus constructed is assembled, firstly the flanged disk $1_1$ and the wavy plate $1_2$ are placed on the seat stay S, and are fastened together by the threaded bolts 7 and nuts, holding or squeezing the seat stay therebetween. The lamp mount 9 is loosely connected with the mounting unit 1 by the screws passed through the slots 10 in the lamp mount 9, and then the lamp mount is rotated into a desired angular position with respect to the mounting unit 1. The lamp mount 9 is then fixed by tightening the screws 11. The lamp unit 17 is then connected to the lamp mount 9, i.e., the rails 12 are brought into sliding engagement with the guide grooves 13, and the lamp unit 17 is pushed to slide on the mount 9 until the latching projection 15 on the mount 9 engages with the projection 16 on the lamp unit 17. The lamp unit 17 is thus fixed in a desired angular position. The lamp unit 17 may be readily removed by disengaging the latching projection 15 (e.g. by finger) and pulling the lamp unit 17 off.

As described above, the lamp mount 9 can be rotated with respect to the mounting unit 1 to conform to the frame angle which may vary with the type of bicycles. This means that the lamp mounting structure makes it possible to place a reflector of the lamp unit perpendicular to the road surface, regardless of the frame angle. Moreover, the slide coupling means, including the rails 12, guide grooves 13, and the latching projection 15, permits the user to readily connect or disconnect the lamp unit to or from the lamp mount 9, whereby the user can use the bicycle with or without the lamp unit.

The mounting structure may be mounted on other framework parts then the seat stay. For example, the lamp unit may be mounted on the front fork and serve as a head lamp instead of a tail lamp.

What is claimed is:

1. A lamp mounting structure for a bicycle, comprising:
   a mounting unit including two members to firmly hold therebetween a part of a bicycle, such as a seat stay thereof;
   a lamp mount detachably screwed to said mounting unit, and having angle adjusting means for adjusting the angular position of said lamp mount relative to said mounting unit;
   said angle adjusting means comprising a plurality of openings provided in said lamp mount, said openings including a pair of arcuate slots centered on the same point, and in which threaded bolts are passed through said arcuate slots for screwing said lamp mount to said mounting unit; and,
   a lamp unit detachably mounted on said lamp mount, said lamp mount and said lamp unit being provided with slide coupling means for their relative sliding movement on each other, said slide coupling means comprising a pair of guide rails provided on opposite sides of said lamp mount, one rail on each side, a tongue extending from another side of said lamp mount, a latching projection provided on the tip of said tongue, and means provided in said lamp unit for engagement with said latching projection.

2. A lamp mounting structure for a bicycle, comprising a mounting unit including members to firmly hold a part of a bicycle, such as a seat stay thereof;
   a lamp mount detachably screwed to said mounting unit and having angle adjusting means for adjusting the angular position of said lamp mount relative to said mounting unit; and
   said angle adjusting means comprising a plurality of openings provided in said lamp mount, at least one of said openings being arcuate, said arcuate opening and another of said plurality of openings being centered on the same point, and fastening means extending through said arcuate opening and said opening centered on the same point for securing said lamp mount to said mounting unit;
   a lamp unit detachably mounted on said lamp mount, said lamp mount and said lamp unit being provided with slide coupling means for their relative sliding movement on each other, said slide coupling means comprising: a pair of guide rails provided on opposite sides of said lamp mount, one rail on each side, a tongue extending from another side of said lamp mount, a latching projection provided on the tip of said tongue, and means provided in said lamp unit for engagement with said latching projection.

3. A lamp mounting structure as claimed in claim 2, in which said means comprises a projection.

4. A lamp mounting structure as claimed in claim 2, in which said means comprises a depression.

5. A lamp mounting structure as claimed in claim 1, in which said means comprises a projection.

6. A lamp mounting structure as claimed in claim 1 in which said means comprises a depression.

* * * * *